United States Patent Office 3,403,302
Patented Sept. 24, 1968

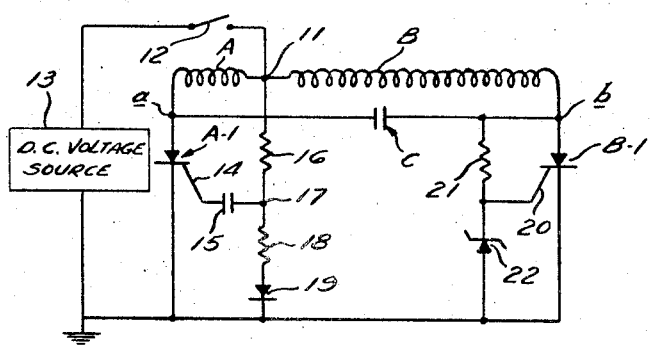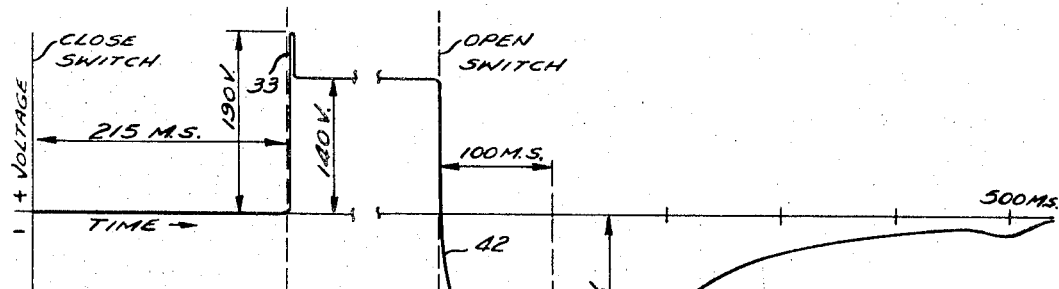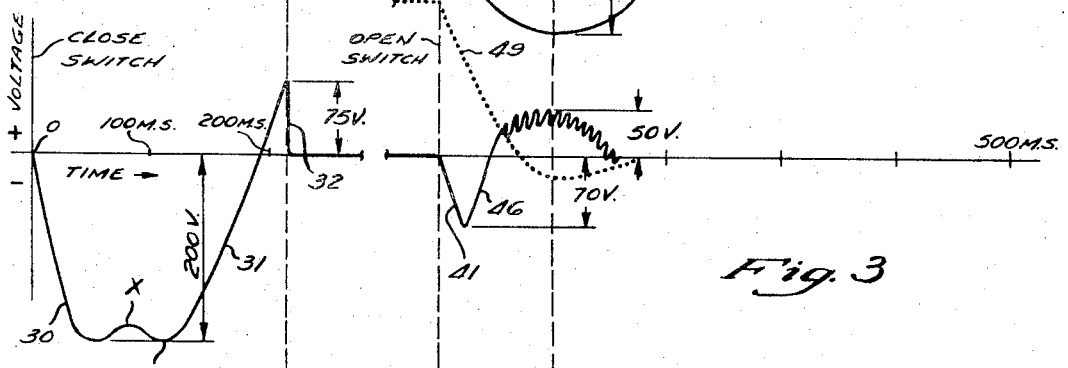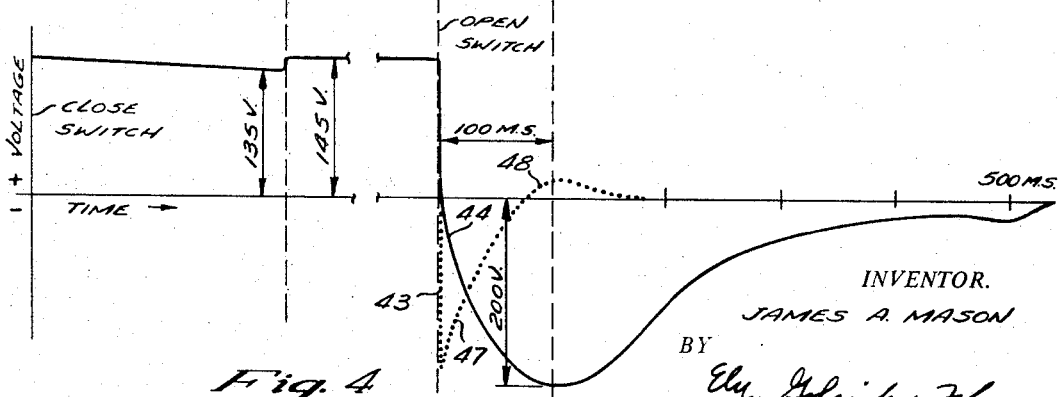

3,403,302
COMMUTATING TWO-COIL CONTROL FOR ELECTROMAGNETICALLY-OPERATED DEVICE
James A. Mason, Shaker Heights, Ohio, assignor, by mesne assignments, to Eaton Yale & Towne, Inc., a corporation of Ohio
Filed June 16, 1965, Ser. No. 464,466
13 Claims. (Cl. 317—148.5)

ABSTRACT OF THE DISCLOSURE

The field coil of an electromagnetically-operated device has two oppositely-wound, inductively coupled coils connected across a capacitor. When a voltage is applied to the junction point between the coils, an SCR turns on to complete a path for a high current surge through the smaller coil, which establishes a magnetic field for pulling in the armature of the device and induces a voltage across the larger coil to prevent it from conducting. After the armature is in, the capacitor discharges through another SCR which completes a path for current through the larger coil, which now produces an armature-holding magnetic field in the same direction as the field previously established by the smaller coil. This capacitor discharge also turns off the SCR for the smaller coil. This condition prevails until the voltage at the junction point between the coils is removed, at which time the capacitor causes a rapid collapse of the magnetic field produced by the second coil to speed up the release of the armature.

---

This invention relates to a control circuit for an electromagnetically-operated device, such as an electromagnetic brake or clutch having an armature which moves axially in response to energization of the field coil, or an electromagnetic brake or clutch having ferromagnetic particles which couple an armature to a field body in response to energization of the field coil, or a solenoid having a magnetically attractable, movable armature.

In the case of a brake, clutch or solenoid having a movable armature, the armature normally is urged in one direction by a spring and the bias force of the spring is to be overcome by energizing the field coil. In the case of a magnetic particle clutch or brake, the armature is mounted for rotation with respect to the field body and ferromagnetic particles are disposed in the relatively small space between the pole tips of the field body and the armature. When the field coil is energized, these ferromagnetic particles become magnetized to couple the armature to the field body. In all such devices, there is inevitably a time delay between the instant when a switch is closed to energize the field coil and the instant when the magnetic field produced by the field coil is sufficiently high to effect the desired movement of the armature or magnetization of the ferromagnetic particles. Similarly, there is a time delay between the instant when the switch is opened to de-energize the field coil and the instant when the magnetic field produced by the field coil has collapsed sufficiently to release the armature or to permit sufficient demagnetization of the ferromagnetic particles. In each case, the delay is due to the various magnetic inertias which must be satisfied before the magnetic field can be built up or collapsed.

The principal purpose of the present invention is to shorten these response times in electromagnetically-operated devices, such as electromagnetic brakes or clutches and solenoids.

In accordance with one aspect of the present invention, the response time for energizing the field coil is greatly reduced by the provision of a novel arrangement for accelerating the build-up of its magnetic field.

Another aspect of this invention is directed to the provision of such an arrangement in which there is a commutation between the condition in which this magnetic field is initially built up and the later steady-state condition in which the already-established magnetic field merely has to be maintained, such commutation taking place automatically as a consequence of the actual response of the electromagnetically-operated device to the initial build-up of this field and not being dependent upon an assumed response of the device.

A further aspect of this invention is concerned with such an arrangement which shortens the response time for the collapse of the field coil's magnetic field after it is de-energized.

Further objects and advantages of this invention will be apparent from the following detailed description of a presently-preferred embodiment thereof, which is illustrated schematically in the accompanying drawings.

In the drawings:

FIGURE 1 is a schematic electrical circuit diagram of the preferred embodiment of the present control;

FIGURE 2 shows a plot of the voltage (with respect to ground) at point a in FIG. 1 versus time, immediately after the switch is closed to energize the field coil and also immediately after the switch is opened to de-energize the field coil;

FIGURE 3 shows in full lines a similar plot of the voltage (with respect to ground) at point b in FIG. 1, with the same time scale as in FIG. 2, and also shows in dotted lines the current at point b just before and after the switch is opened;

FIGURE 4 shows similar plots of the voltage (with respect to ground) and the current at point 11 in FIG. 1, with the same time scale;

Figure 5:
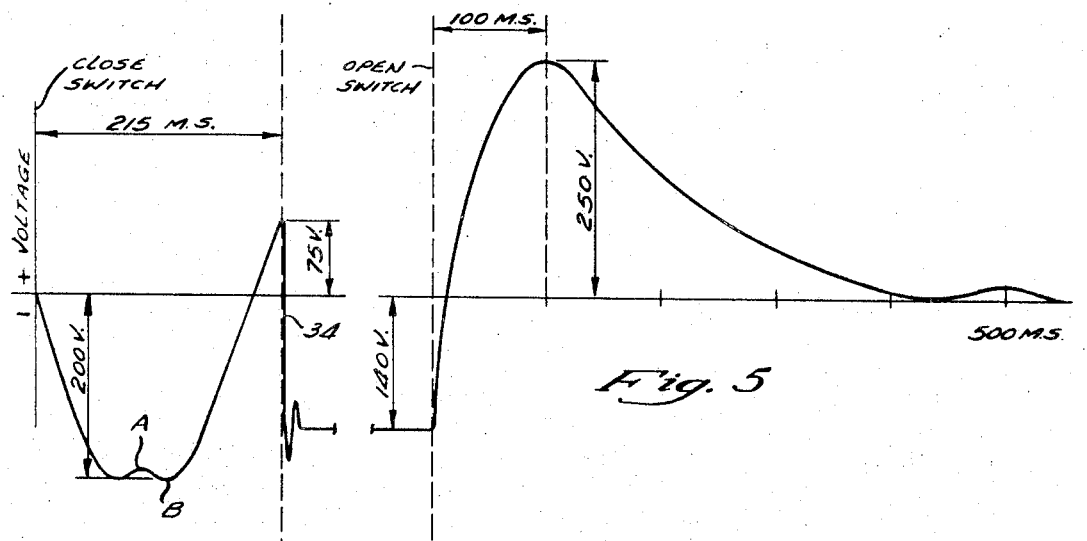
FIGURE 5 shows a similar plot of the voltage across capacitor C in FIG. 1, with the same time scale.
Figure 6:
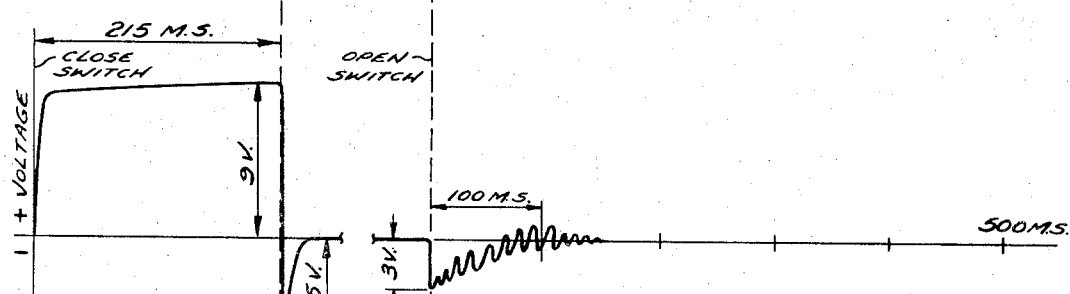
FIGURE 6 shows a similar plot of the voltage (with respect to ground) at gate electrode 14 in FIG. 1, with the same time scale.

Referring first to FIG. 1, the control circuit shown therein comprises a capacitor C and a pair of coils A and B connected in series with each other between the opposite terminals of the capacitor. The coils are oppositely wound and they are physically positioned so that there is a strong mutual inductance coupling between them. Coils A and B together constitute the field coil of the electromagnetically-operated device (not shown) whose operation is to be controlled by this control circuit. This device may be an electromagnetic brake or clutch with an axially movable armature, or it may be an electromagnetic particle brake or clutch, or it may be a solenoid, for example. Coil B has several times the number of turns of coil A, and the impedance of coil B is several times that of coil A. In practice, the turns ratio between coils B and A may be about 10 to 1.

The right end of coil A in FIG. 1 is connected directly at point a to the left side of capacitor C and to the anode of a first silicon controlled rectifier, A–1, which constitutes a first voltage-responsive switch in this control.

The right end of coil B in FIG. 1 is connected directly at point b to the right side of capacitor C and to the anode of a second silicon controlled rectifier, B–1, which constitutes a second voltage-responsive switch in this control.

The right end of coil A and the left end of coil B are directly connected to each other at a junction point 11. A switch 12 is connected between this junction point and the positive side of a suitable D.C. voltage source 13. The opposite side of this voltage source is grounded.

When the device operated by the present control circuit is a relatively small electromagnetic particle brake or clutch, this D.C. voltage source 13 preferably is a rectified A.C. power source having a filter capacitor across its output. For a much larger, higher wattage (e.g., 150 watts) electromagnetic brake with an axially movable armature the D.C. voltage source 13 may be a three-phase rectified A.C. power supply.

The first SCR, A–1, has its cathode grounded and its gate electrode 14 connected to junction point 11 by way of a series-connected capacitor 15 and resistor 16, which together provide the starting circuit for the first SCR. The junction point 17 between capacitor 15 and resistor 16 is connected through a resistor 18 and a blocking diode 19 to ground. The cathode of diode 19 is grounded. Diode 19 permits positive current to flow from point 17 to ground but it blocks positive current in the reverse direction.

The second SCR, B–1, has its cathode grounded and its gate electrode 20 connected by a resistor 21 to point $b$. A Zener diode 22 is connected between gate electrode 20 and ground. The anode of Zener diode 22 is grounded.

In one practical embodiment of this circuit, which is used to control the operation of a four-inch magnetic particle brake, coil A has 45 turns of number 32 wire and has a resistance of 6.4 ohms, coil B has 450 turns of the same wire and a resistance of 58 ohms, capacitor C is rated at 15 mfd. and 50 volts D.C., both SCR's, A–1 and B–1, are identical, resistor 16 is 11,000 ohms, resistor 18 is 1,000 ohms, capacitor 15 is .015 mfd., and resistor 21 is 2,500 ohms.

In a second embodiment of this circuit, used to control an 11½ inch mutliple-disc electromagnetic brake having an axially movable, magnetically attractable armature, coil A has 300 turns of number 32 wire and has a resistance of 12.5 ohms, coil B has 2,700 turns of the same wire and a resistance of 125 ohms, capacitor C is rated at 70 mfd. and 100 volts D.C., both SCR's A–1 and B–1, are identical, resistor 16 is 11,000 ohms, resistor 18 is 270 ohms, capacitor 15 is .01 mfd., and resistor 21 is 22,000 ohms.

The voltage and current curves of FIGS. 2–7 show the performance of the just-mentioned second embodiment of the present control circuit operating an 11½ inch multiple disc brake. Similar performance curves are obtained where the control circuit operates a much smaller brake, such as the above-mentioned first embodiment, except that the response times are much shorter due to the much lower magnetic inertias of the smaller brake.

In the FIG. 1 circuit, at the instant when switch 12 is closed (time=0 in FIGS. 2–7), there is an abrupt current pulse through the starting circuit 16, 15 for the first SCR, A–1, which turns the latter on.

When A–1 begins to conduct, there is a sudden positive current surge from junction point 11 through the small coil A from right to left in FIG. 1. This current surge through coil A produces a magnetic field around coil A for pulling in the armature. Also, because of the inductive coupling between coils A and B, this abrupt current surge through the small coil A induces across the large coil B a high voltage drop which is + to − from point 11 to point $b$ because coils A and B are wound in opposite directions. This induced voltage across coil B drives point $b$ down to about 200 volts negative with respect to ground within about 60 milliseconds after the switch is closed, as shown by line 30 in FIG. 3. At the same time the voltage at point $a$ is just slightly above ground potential, as shown in FIG. 2, due to the current-conducting state of A–1, which provides a low resistance path between point $a$ and ground.

At the instant when switch 12 is closed, junction point 11 is at the applied voltage of about 145 volts positive with respect to ground, and this voltage at point 11 declines a few volts during the first 60 milliseconds. After 60 milliseconds the total voltage across coil B (+ to − from point 11 to point $b$) is about 340 volts.

As already stated, the current surge through small coil A causes it to produce rapidly a magnetic field strong enough to pull in the brake armature (not shown) to which it is inductively coupled. The brake itself may be electrically-engaged and spring-released, or it may be spring-engaged and electrically-released. In either case, there is a spring opposing the movement of the armature in response to energization of coil A. Because point $b$ is negative with respect to ground, the second SCR, B–1, does not conduct. Therefore, even though coil B has many turns (and therefore a high inductance) it is essentially open-circuited and does not retard the rapid rate at which the high current, low inductance coil A is building up the magnetic field.

As the time rate of change of current ($di/dt$) through the small coil A decreases, the voltage which it induces across the large coil B diminishes also. That is, at about 60 milliseconds after switch 12 is closed, the voltage at point $b$ starts to become less negative. At some point X, on the now-diminishing voltage curve of point $b$ (FIG. 3), the armature begins moving in. In the specific example under discussion, this point occurs at about 90 milliseconds after the switch is closed. This movement of the armature produces a momentary increase in the voltage across coil B because the magnetic energy previously built up in the air gap between the armature and the field poles now is being added to the energy applied at junction point 11 due to the fact that the size of the air gap is being reduced as the armature moves in. At point Y on the FIG. 3 curve the armature now is fully engaged and can move no farther axially inward. In the specific example under discussion, point Y occurs at about 140 milliseconds after the switch is closed.

After the armature has stopped moving, the voltage at point $b$ resumes its gradual reduction in magnitude, as shown by line 31 in FIG. 3. This rise is due to the progressive reduction of the voltage induced across coil B by the current through coil A, whose rate with respect to time ($di/dt$) now is decreasing. As shown in FIG. 3, the voltage at point $b$ crosses the zero axis at about 195 milliseconds after switch 12 is closed, and it continues up and becomes progressively more positive with respect to ground (but still negative with respect to point 11) due to the applied positive voltage at point 11.

When the voltage at point $b$ has risen to about 75 volts positive with respect to ground (the voltage drop from point 11 to point $b$ across coil B being about 60 volts) starting current begins to flow through the gate 20 of the second SCR, B–1, at a time determined by principally the value of resistor 21 in the starting circuit for B–1. In the specific example under discussion, the second SCR, B–1, is turned on at about 215 milliseconds after the switch is closed.

Figure 7:
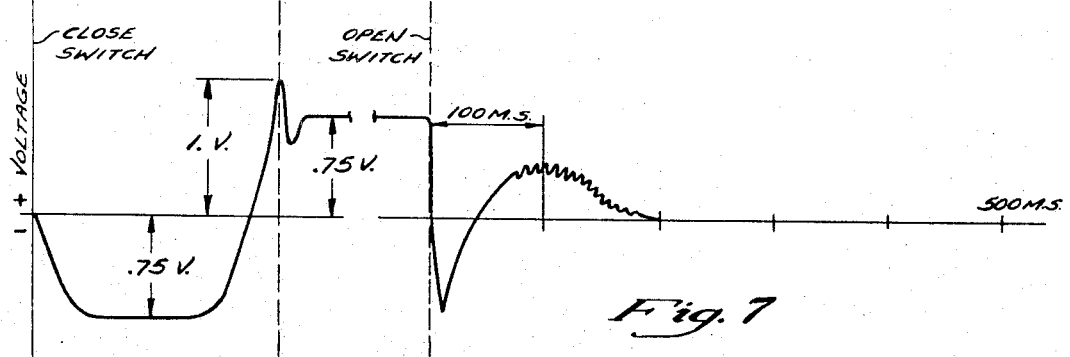
FIGURE 7 shows a similar plot of the voltage (with respect to ground) at gate electrode 20, with the same time scale.

As shown in FIG. 7, after the switch 12 is closed the voltage at the gate electrode 20 of the second SCR, B–1, generally follows the voltage at point $b$, going down rather quickly to 0.75 volt negative with respect to ground and later rising to a peak value of 1.0 volt positive with respect to ground, at which time it turns on B–1.

At the instant just before B–1 is turned on, there is a substantially 75 volt charge across capacitor C, as shown in FIG. 5, its left side being just slightly above ground potential and its right side being about 75 volts positive with respect to ground. When B–1 fires, capacitor C discharges a pulse of positive current from its right side (point $b$) in the forward direction through the second SCR, B–1, to ground and this capacitor discharge current flows back through the first SCR, A–1, in the reverse direction to the left side of the capacitor (point $a$). This reverse current through A–1 turns it off. This capacitor discharge current produces the following:

a substantially instantaneous reduction of the voltage at point $b$ from 75 volts positive with respect to ground down to substantially ground potential, as shown by line 32 in FIG. 3;

a substantially instantaneous rise of the voltage at point *a* from substantially ground potential up to about 190 volts positive with respect to ground, as shown by line 33 in FIG. 2; and a substantially instantaneous reversal of the voltage across capacitor C, from about 75 volts + to − from the right side to the left side, to about 190 volts + to − from the left side to the right side, as shown by line 34 in FIG. 5.

A few milliseconds after the discharge of capacitor C has turned off A–1, the voltage at point *a* drops to about 140 volts positive with respect to ground (which is just slightly lower than the applied voltage at junction point 11) while point *b* remains at substantially ground potential because B–1 continues to conduct current. The voltage across coil B now is about 145 volts, + to − from point 11 to point *b*, which is more than enough to produce a magnetic field of sufficient strength to hold the armature in and at the same time not so high as to produce excessive current through coil B. The magnetic field now produced by coil B (due to the positive current flow through coil B from left to right in FIG. 1) has the same direction as the field initially produced by coil A (due to the positive current flow through coil A from right to left in FIG. 1) because the coils are oppositely wound.

Note that in the operation of this control circuit as thus far described, the high current through the small coil A rapidly produces a magnetic field strong enough to overcome the static inertia of the armature. This takes place much more quickly than would be possible if, in accordance with the conventional prior art practice, the magnetic field produced by coil B to pull in the armature were to be established merely by current through coil B due to the applied voltage at point 11 when the switch is closed. The relatively high inductance of coil B would delay the build-up of this magnetic field, and this relatively long delay is precisely what does occur in conventional magnetic brakes where the closing of the switch merely connects an applied voltage source across the field winding of the brake.

Once the armature is engaged, there is no necessity to maintain a high current through coil A in order to keep the armature in. The present control circuit takes care of this by providing an automatic commutation by turning off the first SCR, A–1, thereby stopping the current through coil A, and turning on the second SCR, B–1, to complete a circuit through coil B between the applied voltage point 11 and ground. As explained, this commutation takes place by virtue of the abrupt discharge of capacitor C. Commutation takes place only after the initial magnetic field of coil A (caused by the current through coil A) has been established and has pulled in the armature completely. The armature and its air gap constitute a finite load on the small coil A when the switch 12 is closed. The time required for coil A to produce a magnetic field strong enough to pull in the armature varies with the magnitude of this load. That is, the greater this load, the longer will be the time required for the applied input energy to coil A to pull in the armature and the longer will be the time period of the voltage which the current through coil A induces across coil B (that is, the longer it will take for this induced voltage, which depends upon the *di/dt* at coil A, to disappear). Consequently, if the armature's inertia is higher than anticipated by the designer of the brake, such as due to temperature factors or friction caused by dirt or other foreign matter, while this would delay the full engagement of the armature, the commutating action of the control circuit would also be delayed until after the armature has been brought in all the way. Thus, the commutation takes place in response to the *actual* operation of the device and is not dependent solely upon as *assumed* time response of the device.

As long as switch 12 remains closed, the armature remains pulled in against the bias of its spring, junction point 11 remains at substantially the applied voltage of 145 volts, point *a* remains at substantially 140 volts, there is substantially no current through coil A and the first SCR, A–1, remains off, there is a substantially steady state D.C. current through coil B and the second SCR, B–1, which produces a magnetic field of sufficient strength to hold the armature in, and point *b* is just slightly above ground potential. Zener diode 22 maintains the gate electrode 20 of B–1 at a fixed positive potential, 0.75 volt above ground, as shown in FIG. 7.

When the user opens switch 12 to de-energize the field coil, the instantaneous removal of the applied voltage source 13 causes the voltage across coil B to reverse substantially immediately, with junction point 11 becoming negative with respect to point *b*. Also, the second SCR, B–2, goes off substantially immediately due to the removal of its current source by the opening of the switch. The first SCR, A–1, remains off.

After the opening of the switch, as shown by line 41 in FIG. 3, the voltage at point *b* drops to a value negative with respect to ground. The voltage at junction point 11 (line 42 in FIG. 2) drops instantaneously from 140 volts positive with respect to ground (before the switch was opened) down to a potential negative with respect to ground and negative with respect to point *b*. This is due to the voltage reversal across coil B.

At the instant the switch is opened, the voltage across capacitor C (FIG. 5) is + to − from point *a* to point *b*, point *a* being 140 volts positive with respect to ground and point *b* being substantially at ground potential.

Accordingly, at this instant there are two voltage sources of additive polarities in series with each other across the small coil A—namely, the voltage across capacitor C (+ to − from point *a* to point *b*) and the voltage across coil B (+ to − from point *b* to point 11). The energy stored at this instant in coil B is much greater than that stored in the capacitor, due to the high inductance of coil B. Therefore, the energy in coil B will prevail over that in capacitor C and will force a reversal of the voltage across the capacitor. This voltage reversal requires first a discharge of the stored energy in the capacitor, followed by a forced injection into the capacitor from coil B of energy opposite in polarity to that stored in the capacitor just before the switch was opened. Stated another way, the capacitor now withdraws from coil B energy which had been producing the magnetic field holding the armature in.

Therefore, capacitor C first discharges positive current from point *a* to point *b*, producing in the small coil A a sharp pulse of positive current flowing from left to right in FIG. 1, from point *a* to point 11. (A very small percentage of this capacitor discharge current through coil A flows via resistors 16, 18, blocking diode 19, Zener diode 22 and resistor 21 to the point *b*, instead of flowing through coil B. However, because the impedance of coil B is much lower than that of circuit elements 16, 18, 19, 22 and 21, most of the capacitor discharge current will flow through coil B—or, stated in other terms, practically all of the discharge of the capacitor will withdraw stored energy from coil B.) The capacitor discharge current pulse is shown by the dotted line 43 in FIG. 4, which is negative in direction because the assumed positive direction of current through coil A is from point 11 to point *a*. Due to the inductive coupling between coils A and B, this current pulse through coil A induces a large voltage across coil B which is − to + from junction point 11 to point *b*. This induced voltage across coil B is in the same direction as the voltage reversal across coil B caused by the opening of switch 12. The magnetic field produced by this current pulse through coil A is opposite to the magnetic field which coil B had been producing while switch 12 was closed. Consequently, both the removal of the applied voltage at point 11 by the opening of switch 12 and the magnetic field produced by the capacitor discharge current through coil A force a rapid collapse of this magnetic field of coil B to speed up the release of the armature.

Within a few milliseconds after the switch is opened, these two additive voltages across coil B (− to + from point 11 to point b) have driven point 11 from 145 volts positive with respect to ground (before the switch was opened) down to a voltage negative with respect to ground, as shown by line 44 in FIG. 4. Initially, the voltage at point b falls rapidly to about 70 volts negative with respect to ground (but still positive with respect to point 11), as shown by line 41 in FIG. 3. Then, as the voltage induced across coil B by the capacitor discharge current through coil A increases in magnitude, the voltage at point b rises relatively steeply (line 46 in FIG. 3) to a value positive with respect to ground.

As shown in FIG. 4, the capacitor discharge current through coil A, after its initial steep increase in magnitude (dotted line 43), decreases in magnitude (dotted line 47) while still remaining negative in direction until, at about 70 milliseconds after switch 12 is opened, it crosses the zero axis and reverses in direction (dotted line 48).

During this same 70 millisecond period following the opening of the switch, the current at point b (positive in sign from point 11 to point b) decreases in magnitude (dotted line 49 in FIG. 3) from its maximum value, when the switch was first opened, down to the point 70 milliseconds thereafter when it reverses in direction.

The blocking diode 19 positively prevents the voltage at gate electrode 15 for the first SCR, A–1, from rising to a value positive with respect to ground and thereby it insures that A–1 cannot turn on again after switch 12 is opened.

At 100 milliseconds after the switch is opened, the voltage at point 11 (FIG. 4) has reached its maximum value of 200 volts negative with respect to ground. At this time, point a (FIG. 2) has reached its maximum voltage of 190 volts negative with respect to ground. At this time, the voltage at point b (FIG. 3) is about 50 volts positive with respect to ground. Consequently, at 100 milliseconds after opening the switch, the voltage across capacitor C (FIG. 5) is about 240 volts, with point b now being 240 volts positive with respect to point a. That is, the voltage across the capacitor has been reversed by the transfer of energy from coil B, which energy transfer produces a rapid collapse of the magnetic field that coil B has been producing before switch 12 was opened.

About 70 milliseconds after switch 12 is opened, the current direction in the circuit composed of capacitor C and the two coils A and B is the reverse direction from its direction during the first 70 milliseconds. That is, there is after 70 milliseconds a small positive current flow from point b through coils B and A in series to point a, this current gradually diminishing in magnitude. At the same time, the positive voltage at point b gradually diminishes in magnitude, and the negative voltages at points 11 and a diminish in magnitude at a slower rate.

Because of the inertia of the magnetic field which was produced by coil B due to its current from voltage source 13 while switch 12 was closed, this field does not collapse immediately with the voltage reversal across coil B. Instead, it lags in time behind that voltage reversal. In the specific brake under discussion, this magnetic field has collapsed enough to release the armature at about 560 milliseconds after switch 12 is opened. However, while such a finite time lag is inevitably present, it is to be understood that this time lag is greatly shortened by the novel arrangement of the present control circuit in which the capacitor discharge greatly accelerates the collapse of the torque-sustaining magnetic field which had been produced by the applied voltage across coil B.

From the foregoing description, it will be apparent that the specific control circuit shown in FIG. 1 and described in detail provides, in response to the closing of the switch, a rapid build-up of the magnetic field of the field coil, followed by an automatic commutation to the steady state condition after this field has been established, and provides, in response to the opening of the switch, a rapid collapse of the magnetic field of the field coil. However, while a presently-preferred embodiment of the present control circuit has been illustrated schematically in FIG. 1 and its performance described in detail with reference to a particular large electromagnetic brake, it is to be understood that the invention is susceptible of other embodiments differing from the specific circuit shown and described and that this control circuit may be used with a variety of electromagnetically-operated devices other than those mentioned herein. For example, the two coils A and B, which together constitute the field coil of the device, may be electrically connected and physically related to each other in a manner different from that shown and described with reference to FIG. 1, but still *effectively* wound opposite to one another such that the initial current surge through coil A when the switch is closed will induce across coil B a voltage drop from point 11 to point b.

I claim:
1. A control circuit for an electromagnetically-operated device comprising:
   first and second coils which together constitute the field coil of the device, said coils being inductively coupled to each other, said second coil having several times the turns of said first coil;
   means for initially producing a high current surge through the first coil which establishes a magnetic field;
   and means operable, after said magnetic field has been established by the first coil, for stopping the current through the first coil and establishing smaller current through the second coil which produces a magnetic field in the same direction as the field originally established by the first coil.

2. A control circuit for an electromagnetically-operated device comprising:
   first and second coils which together constitute the field coil of the device, said coils being connected to each other at a junction point, said second coil having a substantially greater number of turns than said first coil and inductively coupled to the latter and effectively wound opposite to the first coil;
   switch means for selectively applying a D.C. voltage to said junction point beyond the coils;
   and means operable initially in response to the closing of said switch means to cause a high current surge from said junction point in one direction through said first coil which establishes a magnetic field and induces a high voltage across said second coil, and operable after the disappearance of said induced voltage across the second coil to establish a substantially smaller current from said junction point in the opposite direction through said second coil which produces a magnetic field in the same direction as the field originally estabilshed by the first coil and to stop the high current through the first coil while said switch means remains closed.

3. A control circuit for an electromagnetically-operated device comprising:
   first and second coils which together constitute the field coil of the device, said coils being connected to each other at a junction point, said second coil having several times the turns of said first coil and inductively coupled to the latter and effectively wound opposite to the first coil;
   switch means for selectively applying a D.C. voltage to said junction point between the coils;
   first voltage-responsive switch means connected to the first coil and operable, in response to the application of said D.C. voltage to said junction point, to complete a circuit between said first coil and a reference potential different from said applied D.C. voltage to thereby cause a high current surge from said junction point in one direction through said first coil which establishes a magnetic field and induces a high voltage across said second coil;

and second voltage-responsive switch means connected to the second coil and operable, after the disappearance of said induced voltage across the second coil, to complete a circuit between said second coil and a reference potential different from said applied D.C. voltage so as to establish a substantially smaller current from said junction point in the opposite direction through said second coil which provides a magnetic field in the same direction as the field originally established by the first coil as long as said D.C. voltage remains applied;

said first voltage-responsive switch means opening said circuit for the first coil to stop the high current therethrough upon the completion of said circuit for the second coil.

4. A control circuit for an electromagnetically-operated device comprising:

first and second coils which together constitute the field coil of the device, said coils being connected to each other at a junction point, said second coil having several times the turns of said first coil and inductively coupled to the latter and effectively wound opposite to the first coil;

switch means for selectively applying a D.C. voltage to said junction point between the coils;

a first controlled rectifier connected between said first coil and ground, a starting circuit for said first controlled rectifier connected to said switch means to turn on said first controlled rectifier in response to the closing of said switch means to thereby cause a high current surge through said first coil which establishes a magnetic field and induces a high voltage across said second coil;

and a second controlled rectifier connected between said second coil and ground, a starting circuit for said second controlled rectifier connected to said second coil and operable, in response to the disappearance of said induced voltage across the second coil and the continued application of said D.C. voltage to said junction point, to turn on said second controlled rectifier and thereby to establish a substantially smaller current through said second coil which produces a magnetic field in the same direction as the field originally established by the first coil;

said first controlled rectifier turning off to stop the high current through the first coil in response to the turning on of the second controlled rectifier.

5. A control circuit for an electromagnetically-operated device comprising:

a capacitor having opposite first and second terminals;

a first coil and a second coil connected respectively to said first and second capacitor terminals, said second coil having several times the turns of said first coil and a substantially higher impedance than said first coil, said second coil being inductively coupled to said first coil and effectively wound opposite to the first coil;

switch means for selectively applying a D.C. voltage to said coils;

first voltage-responsive switch means connected between said first capacitor terminal and ground;

second voltage-responsive switch means connected between said second capacitor terminal and ground;

said first voltage-responsive switch means being operative to close in response to the application of said D.C. voltage to said coils to thereby cause a high current surge through said first coil and said first voltage-responsive switch means to ground, which current surge establishes a magnetic field and induces a high voltage across said second coil that maintains said second voltage-responsive switch means open;

and said second voltage-responsive switch means being operative, after said induced voltage has disappeared and the potential at said second capacitor terminal has reversed in sign due to the continued application of said D.C. voltage to said coils, to close and thereby complete a current path through said second coil and said second voltage-responsive switch means to ground so as to produce a magnetic field in the same direction as the field originally established by the first coil and to discharge the capacitor in the forward direction through the second voltage-responsive switch means and in the reverse direction through the first voltage-responsive switch means to open the latter and thereby stop the high current through the first coil.

6. A control circuit for an electromagnetically-operated device comprising:

a capacitor having opposite first and second terminals;

a first coil and a second coil connected respectively to said first and second capacitor terminals and connected to one another at a junction point, said second coil having several times the turns of said first coil and a substantially higher impedance than said first coil, said second coil being inductively coupled to said first coil and effectively wound opposite to the first coil;

switch means for selectively applying a D.C. voltage to the junction point between said coils;

a first controlled rectifier connected between said first capacitor terminal and ground, a starting circuit for said first controlled rectifier connected to said switch means;

a second controlled rectifier connected between said second capacitor terminal and ground, a starting circuit for said second controlled rectifier connected to said second capacitor terminal;

said starting circuit for the first controlled rectifier being operative to turn the latter on in response to the closing of said switch means to thereby cause a high current surge from said junction point through said first coil and said first controlled rectifier to ground, which current surge establishes a magnetic field and induces a high voltage across said second coil that maintains said second controlled rectifier non-conducting;

and said starting circuit for the second controlled rectifier being operative, after said induced voltage has disappeared and the potential at said second terminal of the capacitor has reversed in sign due to the continued application of said D.C. voltage to said junction point, to turn on said second controlled rectifier to complete a path from said junction point for substantially lower current through said second coil which produces a magnetic field in the same direction as the field established by the first coil and to discharge the capacitor in the forward direction through the second controlled rectifier and in the reverse direction through the first controlled rectifier to turn the latter off and thereby stop the high current through the first coil.

7. A control circuit for an electromagnetically-operated device comprising:

a capacitor having opposite first and second terminals;

a first coil and a second coil which together constitute the field coil of the device, said first and second coils being connected respectively to said first and second capacitor terminals and in series with each other across said capacitor, said coils being inductively coupled to each other and effectively oppositely wound, said second coil having a substantially greater number of turns and a substantially higher impedance than said first coil;

switch means for selectively applying a D.C. voltage to the junction point between said coils;

a first controlled rectifier connected between said first capacitor terminal and ground and having a gate electrode, a starting circuit for said first controlled rectifier connected between said junction point and said gate electrode;

a second controlled rectifier connected between said second capacitor terminal and ground and having a gate electrode, and a starting circuit for said second controlled rectifier connected between said second capacitor terminal and said last-mentioned gate electrode.

8. A control circuit for an electromagnetically-operated device comprising:

a capacitor having opposite first and second terminals;

a first coil and a second coil which together constitute the field coil of the device, said first and second coils being connected respectively to said first and second capacitor terminals and in series with each other across said capacitor, said coils being inductively coupled to each other and effectively oppositely wound, said second coil having a substantially greater number of turns and a substantially higher impedance than said first coil;

switch means for selectively applying a D.C. voltage to the junction point between said coils;

a first controlled rectifier connected between said first capacitor terminal and ground and having a gate electrode, a starting circuit for said first controlled rectifier connected between said junction point and said gate electrode, a blocking diode connected between said gate electrode and ground and having a polarity preventing positive current flow from ground to said gate electrode;

a second controlled rectifier connected between said second capacitor terminal and ground and having a gate electrode, a starting circuit for said second controlled rectifier connected between said second capacitor terminal and said last-mentioned gate electrode, and a Zener diode having its cathode connected to said last-mentioned gate electrode and its anode connected to ground.

9. A control circuit for a nelectromagnetically-operated device comprising:

a capacitor having opposite first and second terminals;

a first coil and a second coil connected respectively to said first and second capacitor terminals and in series with each other across said capacitor, said coils being inductively coupled to each other and effectively oppositely wound, said second coil having several times the turns of said first coil and a substantially higher impedance than said first coil;

switch means for selectively applying a D.C. voltage to the junction point between said coils;

a first controlled rectifier connected between said first capacitor terminal and ground and having a gate electrode, a starting circuit for said first controlled rectifier connected between said junction point and said gate electrode;

a second controlled rectifier connected between said second capacitor terminal and ground and having a gate electrode, a starting circuit for said second controlled rectifier connected between said second capacitor terminal and said last-mentioned gate electrode;

said starting circuit for the first controlled rectifier being operative to turn the latter on in response to the closing of said switch means to thereby cause a high current surge from said junction point through said first coil and said first controlled rectifier to ground, which current surge establishes a magnetic field and induces a high voltage across said second coil that maintains said second controlled rectifier non-conducting;

said starting circuit for the second controlled rectifier being operative, after said induced voltage has disappeared and the voltage at said second capacitor terminal has reversed in sign due to the continued application of said D.C. voltage to said junction point, to turn on said second controlled rectifier to complete a path from said junction point for substantially smaller current through said second coil which produces a magnetic field in the same direction as the field initially established by the first coil and to discharge the capacitor in the forward direction through the second controlled rectifier and in the reverse direction through the first controlled rectifier to turn the latter off and thereby stop the high current through the first coil;

said capacitor, while the second controlled rectifier remains on and the first controlled rectifier remains off, becoming charged positive on said first terminal thereof with respect to said second terminal;

said switch means, when opened, removing said D.C. voltage from said junction point to produce a voltage reversal across the second coil and to turn off said second controlled rectifier;

said capacitor, in response to the opening of said switch means, discharging current from said first terminal to said second terminal through said coils, which current through the first coil induces a voltage across the second coil of the same sign as said voltage reversal across the second coil caused by the opening of said switch means, whereby to speed up the collapse of the magnetic field which had been produced by the current through the second coil while said switch means remained closed.

10. A control circuit for an electromagnetically-operated device comprising:

a capacitor having opposite first and second terminals;

a first coil and a second coil connected respectively to said first and second capacitor terminals and in series with each other across said capacitor, said coils being inductively coupled to each other and effectively oppositely wound, said second coil having several times the turns of said first coil and a substantially higher impedance than said first coil;

switch means for selectively applying a positive D.C. voltage to the junction point between said coils;

a first silicon controlled rectifier connected between said first capacitor terminal and ground and having a gate electrode, a starting circuit for said first silicon controlled rectifier connected between said junction point and said gate electrode;

a second silicon controlled rectifier connected between said second capacitor terminal and ground and having a gate electrode, a starting circuit for said second silicon controlled rectifier connected between said second capacitor terminal and said last-mentioned gate electrode;

said starting circuit for the first silicon controlled rectifier being operative to turn the latter on in response to the closing of said switch means to thereby cause a high current surge from said junction point through said first coil and said first silicon controlled rectifier to ground, which current surge establishes a magnetic field and induces a high voltage drop across said second coil from said junction point to said second capacitor terminal that maintains said second silicon controlled rectifier non-conducting;

said starting circuit for the second silicon controlled rectifier being operative, after said induced voltage has disappeared and the voltage at said second capacitor terminal has become positive with respect to ground due to the continued application of said D.C. voltage to said junction point, to turn on said second silicon controlled rectifier to complete a path from said junction point through said second coil for substantially smaller current which produces a magnetic field in the same direction as the field initially established by said first coil and to discharge the capacitor in the forward direction through the second silicon controlled rectifier and in the reverse direction through the first silicon controlled rectifier to turn the latter off and thereby stop the current flow through the first coil;

a Zener diode having its cathode connected to said gate electrode of the second silicon controlled rectifier and having its anode connected to ground;

said capacitor, while the second silicon controlled rectifier remains on and the first silicon controlled rectifier remains off, becoming charged positive on said first terminal thereof with respect to said second terminal;

said switch means, when opened, removing said D.C. voltage from said junction point to produce a voltage reversal across the second coil and to turn off said second silicon controlled rectifier;

said capacitor, in response to the opening of said switch means, discharging positive current from said first terminal to said second terminal through the coils, which current through the first coil induces a voltage across the second coil of the same sign as said voltage reversal across the second coil caused by the opening of said switch means, whereby to speed up the collapse of the magnetic field which had been produced by the current through the second coil while said switch means remained closed;

and a blocking diode connected between the gate electrode of the first silicon controlled rectifier and ground and having a polarity preventing said last-mentioned gate electrode from becoming positive with respect to ground after said switch means is opened, whereby to maintain said first silicon controlled rectifier off.

11. A control circuit for an electromagnetically-operated device comprising:

a capacitor having opposite first and second terminals;

a first coil and a second coil connected respectively to said first and second capacitor terminals and in series with each other across said capacitor, said coils being inductively coupled to one another and effectively oppositely wound, said second coil having several times the turns of said first coil and a substantially higher impedance than said first coil;

switch means for selectively applying a D.C. voltage to the junction point between said coils;

and means opreative following the closing of said switch means and while the latter remains closed to maintain current through the second coil for producing a magnetic field and to prevent current through the first coil, whereby said first capacitor terminal becomes charged with respect to said second capacitor terminal;

said switch means, when opened, removing said D.C. voltage from said junction point to produce a voltage reversal across the second coil;

said capacitor, in response to the opening of said switch means, discharging current from said first capacitor terminal through said coils to said second capacitor terminal, which discharge current through the first coil induces a voltage across the second coil of the same sign as said voltage reversal across the second coil caused by the opening of said switch means, whereby to speed up the collapse of the magnetic field which had been produced by the current through the second coil while said switch means remained closed.

12. A control circuit for an electromagnetically-operated device comprising:

a capacitor having opposite first and second terminals;

a first coil and a second coil connected respectively to said first and second capacitor terminals and in series with each other across said capacitor, said coils being inductively coupled to one another and effectively oppositely wound, said second coil having a substantially greater number of turns and a substantially higher impedance than said first coil;

switch means for selectively applying a D.C. voltage to the junction point between said coils;

a controlled rectifier connected between said second capacitor terminal and ground, said controlled rectifier being conductive, following the closing of said switch means and while the latter remains closed, to complete a path for current through said second coil which produces a magnetic field;

and means preventing current through the first coil while said second controlled rectifier is conductive, whereby said first capacitor terminal becomes charged with respect to said second capacitor terminal while said switch means remains closed;

said switch means, when opened, removing said D.C. voltage from said junction point to produce a voltage reversal across the second coil and to render said controlled rectifier non-conductive.

said capacitor, in response to the opening of said switch means, discharging current from said first capacitor terminal through said coils to said second capacitor terminal, which discharge current through the first coil induces a voltage across the second coil of the same sign as said voltage reversal across the second coil caused by the opening of said switch means, whereby to speed up the collapse of the magnetic field which had been produced by the current through the second coil while said switch means remained closed.

13. A control circuit for an electromagnetically-operated device comprising:

a capacitor;

a coil having circuit connections to the capacitor and having a substantially greater energy storage capacity than the capacitor;

switch means for selectively applying a D.C. voltage to said coil;

and means operative following the closing of said switch means and while the latter remains closed to maintain current through the coil for producing a magnetic field and to charge the capacitor in one direction;

said switch means, when opened, removing said D.C. voltage from the coil to produce a voltage reversal across the coil;

said capacitor, in response to the opening of said switch means, discharging through said coil and withdrawing energy stored in the coil while said switch means remained closed, whereby to speed up the collapse of the magnetic field produced by the coil while said switch means remained closed.

References Cited

UNITED STATES PATENTS

| | | |
|---|---|---|
| 1,817,431 | 8/1931 | Anderson. |
| 2,778,978 | 1/1957 | Drew _____ 317—149 X |
| 3,108,208 | 10/1963 | Hayter _____ 317—155.5 |
| 3,113,293 | 12/1963 | Breese et al. |
| 3,182,222 | 5/1965 | Lacy et al. _____ 317—148.5 |
| 3,295,421 | 1/1967 | McCormick. |

LEE T. HIX, *Primary Examiner.*

R. V. LUPO, *Assistant Examiner.*